UNITED STATES PATENT OFFICE.

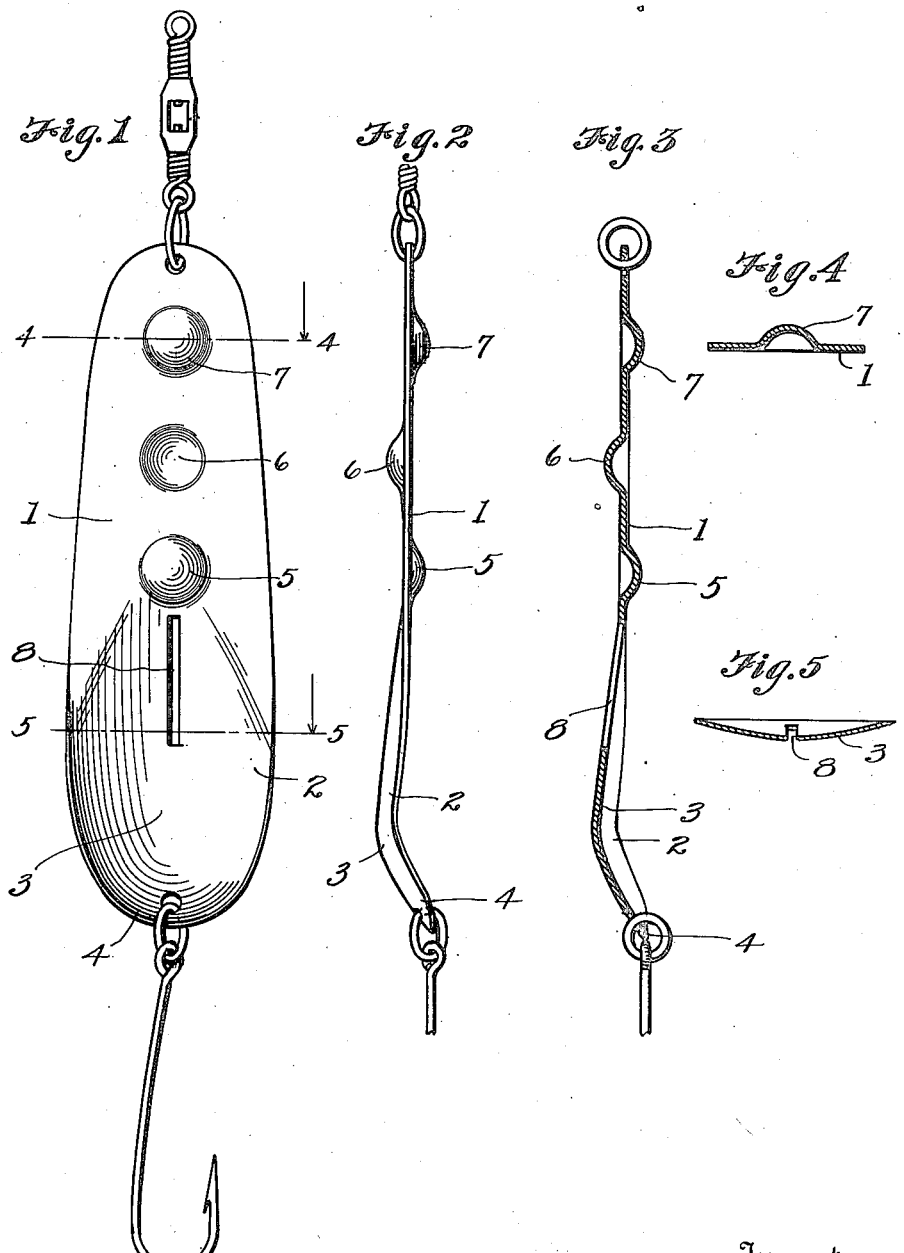

THOMAS G. McCLANAHAN, OF SEATTLE, WASHINGTON.

TROLLING LURE.

1,422,457. Specification of Letters Patent. Patented July 11, 1922.

Application filed November 19, 1920. Serial No. 425,062.

*To all whom it may concern:*

Be it known that I, THOMAS G. MCCLANAHAN, a citizen of the United States, and resident of the city of Seattle, county of King, State of Washington, have invented certain new and useful Improvements in Trolling Lures, of which the following is a specification.

This invention relates to new and useful improvements in trolling lures.

The object of this invention is to provide a lure of an oscillating or rocking type that will simulate the action of a minnow in the water.

A further object of the invention is to provide a lure that embodies distinctive luring characteristics that will attract the fish from quite a distance.

A further object resides in the provision of a lure embodying novel details of construction that preclude tendency to rotate or spin when trolled rapidly through the water.

The invention consists in the arrangement, construction and combination of parts as will be more clearly described in the following specification, illustrated in the accompanying drawings, and finally pointed out in the appended claims.

In the drawings—

Figure 1 is a plan view of the invention.

Figure 2 is a view in side elevation of the same.

Figure 3 is a longitudinal, section thereof.

Figure 4 is a transverse section taken along line 4—4 of Figure 1.

Figure 5 is a transverse section taken along line 5—5 of Figure 1.

Referring more particularly to the drawings, wherein like reference numerals indicate like parts in all the figures—

The numeral 1 illustrates the lure constructed preferably of a strip of thin metal, the rear end thereof being of spoon shaped contour tapering slightly to a comparatively straight front end, that is slightly tipped below the horizontal plane. The spoon shaped rear end does not differ materially from similar constructions of lures that have long been on the market, the differentiation residing in the depressed side edges 2 that extend down and are on a plane with the bottom of the spoon shaped portion 3, which is below the horizontal plane of the medial and forward end of the lure. This construction permits the water to flow over both sides of the lure without impinging against the upturned edges, and results in a steadier motion precluding the tendency of excessive oscillating or rocking when the velocity of the lure is increased in its passage through the water.

The rear end 4 of the lure is extended above the horizontal plane and, in that respect, does not differ from other prior constructions.

Extending forwardly from the medial plane are a plurality of protuberances alternating on the opposite sides of the lure. These protuberances are designated by numerals 5, 6, and 7. The protuberances 5 and 7 are disposed on the reverse side of the depressed spoon shaped portion, whereas the protuberance 6 is on the same side.

In operation, the spoon is drawn through the water; the protuberances, offering a resistance on one side and then the other, causes a vibrating or oscillating motion. This vibrating or oscillating motion is rendered more pronounced by the accentuated protuberance of the spoon shaped rear end which retards the flow of water and will necessarily cause the rear end of the lure to rock from side to side more violently, and, where the velocity is increased, frequently results in a spinning or revolving motion being imparted to the lure. This condition is overcome by the provision of the longitudinal slot 8 along the center line of the medial plane and by the depressed edges 2 which partially removes the pressure of the water against the rear end of the spoon in its deflected position on an angle from the current flow, part of the water passing through the longitudinal slot keeps the lure on an even keel and prevents its rotation. Likewise, a certain volume passes over the depressed edges with less resistance than would be otherwise if the edges were upturned above the horizontal plane.

Having thus described my invention, what I claim as new therein and desire to secure by Letters-Patent, is:

A fishing lure comprising an elongated metal body having its rear end substantially spoon shaped and its forward end substantially straight, and a longitudinal slot extending through said body along the center line forwardly from said spoon shaped portion.

Signed at Seattle, Washington, this 12th day of November, 1920.

THOMAS G. McCLANAHAN.